United States Patent [19]
Myohga et al.

[11] Patent Number: 5,115,161
[45] Date of Patent: May 19, 1992

[54] ULTRASONIC MOTOR

[75] Inventors: Osamu Myohga; Tadao Uchikawa, both of Tokyo, Japan

[73] Assignee: NEC Corporation, Japan

[21] Appl. No.: 620,776

[22] Filed: Dec. 3, 1990

[30] Foreign Application Priority Data

Dec. 4, 1989 [JP] Japan ............................ 1-315842
Dec. 5, 1989 [JP] Japan ............................ 1-316655

[51] Int. Cl.⁵ ............................................ H01L 41/08
[52] U.S. Cl. ...................................... 310/323; 310/325
[58] Field of Search .............. 310/321, 323, 328, 325, 310/366

[56] References Cited

U.S. PATENT DOCUMENTS

| | | | |
|---|---|---|---|
| 4,812,697 | 3/1989 | Mishiro | 310/323 |
| 4,885,499 | 12/1989 | Ueha et al. | 310/328 |
| 4,965,482 | 10/1990 | Ohnishi et al | 310/323 |
| 4,975,614 | 12/1990 | Honda | 310/323 |

Primary Examiner—Mark O. Budd
Attorney, Agent, or Firm—Leydig, Voit & Mayer

[57] ABSTRACT

An ultrasonic motor comprises a stator which generates a combined ultrasonic elliptic vibration which is a combined vibration of longitudinal and torsional vibrations, and a rotor which is in press-contact with the stator and driven by the ultrasonic elliptic vibration via a friction force between the rotor and the stator. The stator comprises a first piezoelectric element for generating the longitudinal vibration, a second piezoelectric element for generating the reacting vibration, a headmass having a large stiffness against said longitudinal vibration and a large inertial mass against the torsional vibration, and a rearmass. In the ultrasonic motor, the resonance frequencies of the longitudinal and torsional vibrations are equal, so that the ultrasonic elliptic vibration is generated efficiently on the rotor in a high power state which is adapted in practical use.

10 Claims, 6 Drawing Sheets

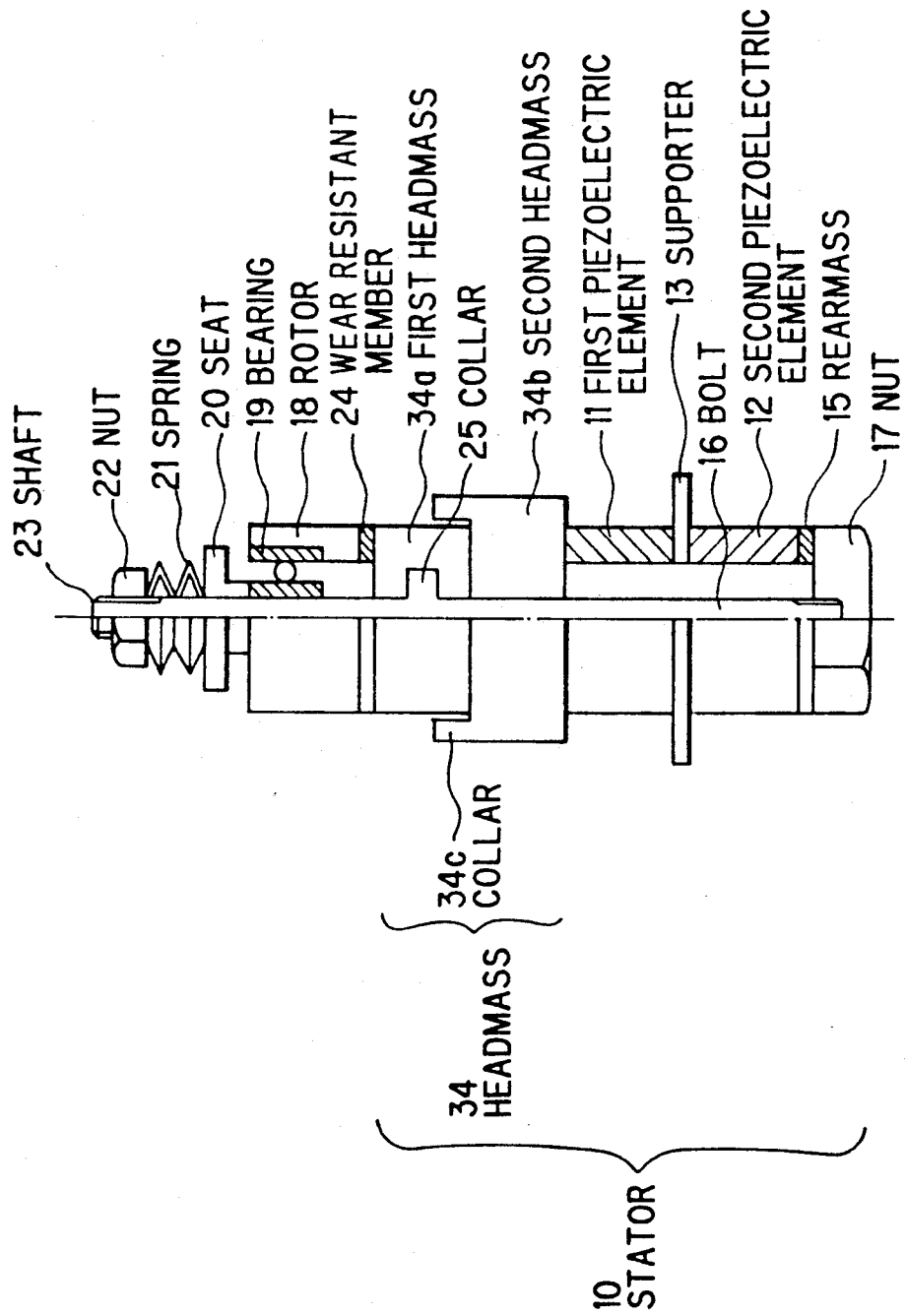

ULTRASONIC MOTOR

FIELD OF THE INVENTION

This invention relates to an ultrasonic motor, and more particularly to, an ultrasonic motor in which a rotor is driven by ultrasonic vibration generated on a stator of a piezoelectric vibrator.

BACKGROUND OF THE INVENTION

An ultrasonic motor is a motor using rotational torque via a friction force which is applied to a rotor in press-contact with a stator of a piezoelectric vibrator generating an ultrasonic elliptic vibration. Compared to a conventional electromagnetic motors based on the interaction between the electric current and magnetic fields, it has such entirely different features as low speed and high torque. More particularly, the torque per unit volume is large, and the ultrasonic motor can be driven without gears and brakes if it is used at low speed.

Various ultrasonic motors have been proposed and researched. For instance, a traveling wave type ultrasonic motor using a traveling wave of bending which is generated on the circumference of a stator is described in Japanese Patent Kokai No. 58-148682. In the traveling wave type ultrasonic motor, the traveling waves which are traveling chronologically are excited on the stator which comprises a piezoelectric ceramic element to rotate a rotor in press-contact tightly with the surface of the stator. However, it is difficult to obtain high torque if the diameter of the ultrasonic motor is small, as the ultrasonic motor uses bending vibration. For instance, torque of a traveling wave type ultrasonic motor having a diameter of 2 cm is no more than 0.1 to 0.2 kgf cm.

On the other hand, a standing wave type ultrasonic motor using a standing wave of bending which is generated on the circumference of a stator is described in Japanese Patent Kokai No. 61-52163. In the standing wave type ultrasonic motor, an ultrasonic elliptic vibration is generated efficiently at an interface between a rotor and a stator. However, the arrangement of structural design elements of the ultrasonic motor is limited, in other words, the degree of freedom in design of shape and size of a vibrator is limited, as it needs a mode conversion in order to excite a torsional vibration by using a piezoelectric longitudinal vibration. Furthermore, the rotating direction, of the elliptic vibration is dependent on the structural design, so that the ultrasonic motor cannot be changed in the rotating direction of the rotor freely.

The inventors have proposed an improved ultrasonic motor, in which a rotating direction of a rotor can be changed freely, having a small diameter and a high torque, as described in Japanese Patent Application No. 62-149726 and on pages 821 to 822 of "Autumn Term Research Meeting Record No. 2-4-10, Oct. 1988, The Acoustical Society of Japan". The ultrasonic motor has a stator consisting of a longitudinal and torsional composite vibrator, having a small diameter and a high torque, and can be changed in the rotating direction of a rotor freely. In the ultrasonic motor, longitudinal and torsional vibrations are excited simultaneously as a resonance vibration to obtain an elliptic vibration which is a composite vibration of the longitudinal and torsional vibrations efficiently and intensively in the interface of the stator and the rotor. In this case, it is necessary that the resonance frequencies of the longitudinal and torsional vibrations are equal in order to excite the resonance vibration. In this ultrasonic motor, the equality of the resonance frequencies of the longitudinal and torsional vibrations is realized in a state that a small electric field is applied. In this state, the strength of the contact-pressure between the rotor and the stator is adjusted by use of a shaft having an adequate diameter which is mounted vertically on the stator.

According to the conventional ultrasonic motor, however, there is a disadvantage in that it is difficult to equalize the resonance frequencies of the longitudinal and torsional vibrations in a state that a large electric field is applied in practical use, for the reason that the resonance frequency of the torsional vibration becomes higher than that of the longitudinal vibration in a large electric field.

SUMMARY OF THE INVENTION

Accordingly, it is an object of the invention to provide an ultrasonic motor having a small diameter in which a high torque is obtained in a high power driving state so that a high efficiency can be obtained by equalizing resonance frequencies of longitudinal and torsional vibrations in a large electric field.

According to a feature of the invention, an ultrasonic motor, comprises:
a stator for generating an ultrasonic elliptic vibration from a combination of longitudinal and torsional vibrations, the stator including first and second piezoelectric elements positioned between a headmass and a rearmass; and
a rotor being in press-contact with the stator to receive the ultrasonic vibration via a friction force from the stator;
wherein the headmass has a large stiffness against the longitudinal vibration and a large inertial mass against the torsional vibration.

BRIEF DESCRIPTION OF THE DRAWINGS

The invention will be described in more detail in conjunction with appended drawings, wherein:

FIG. 4 is a partial cross sectional view illustration an ultrasonic motor in a first preferred embodiment according to the invention;

DESCRIPTION OF THE PREFERRED EMBODIMENTS

Before describing an ultrasonic motor according to the invention, the conventional ultrasonic motor briefly described before will be explained in conjunction with FIGS. 1 to 3.

Figure 1:
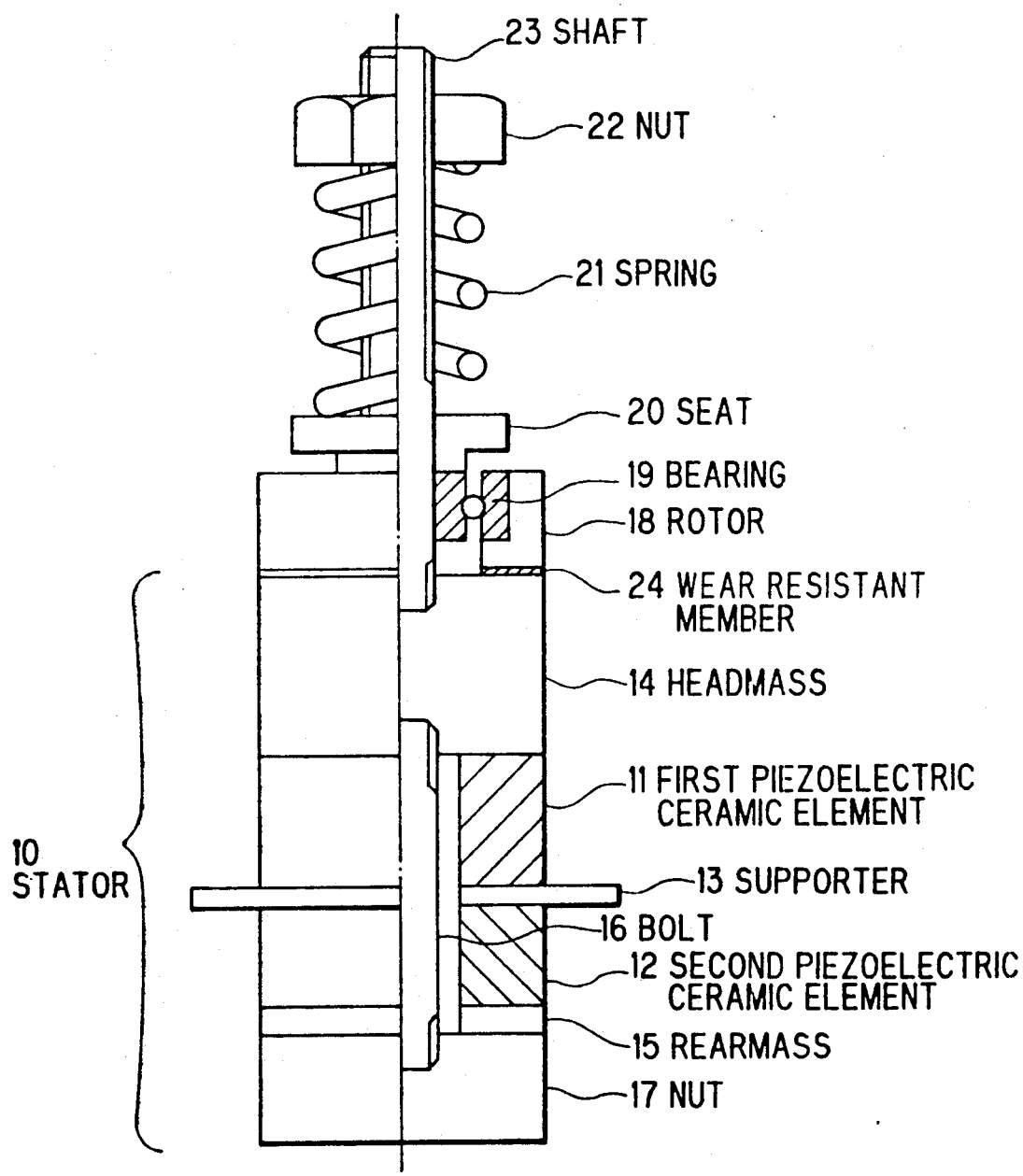
FIG. 1 is a partial cross sectional view illustrating a conventional ultrasonic motor.

FIG. 1 shows a partial cross sectional view illustrating a conventional ultrasonic motor. A first piezoelectric ceramic element 11 which excites a longitudinal vibration is polarized in an axis of the ultrasonic motor. A second piezoelectric ceramic element 12 which excites a torsional vibration is polarized in a circumference of the ultrasonic motor. A rearmass 15, a supporter 13, and the first and second piezoelectric ceramic elements 11 and 12, and a headmass 14 compose a stator 10 functioning as an ultrasonic vibrator to generate an ultrasonic elliptic vibration, and are assembled contiguous to one another firmly by a bolt 16 fixed to the headmass 14 made of Aluminum alloy, and a nut 17 screwed to the bolt 16. A spring 21 provided around a shaft 23 is in press-contact with a rotor 18 on the stator 10 via bearings 19. The strength of the pressure of the spring 21 is adjustable with a nut 22. A wear resistant member 24 is attached on the abrading surface of the rotor 18.

Figure 2:
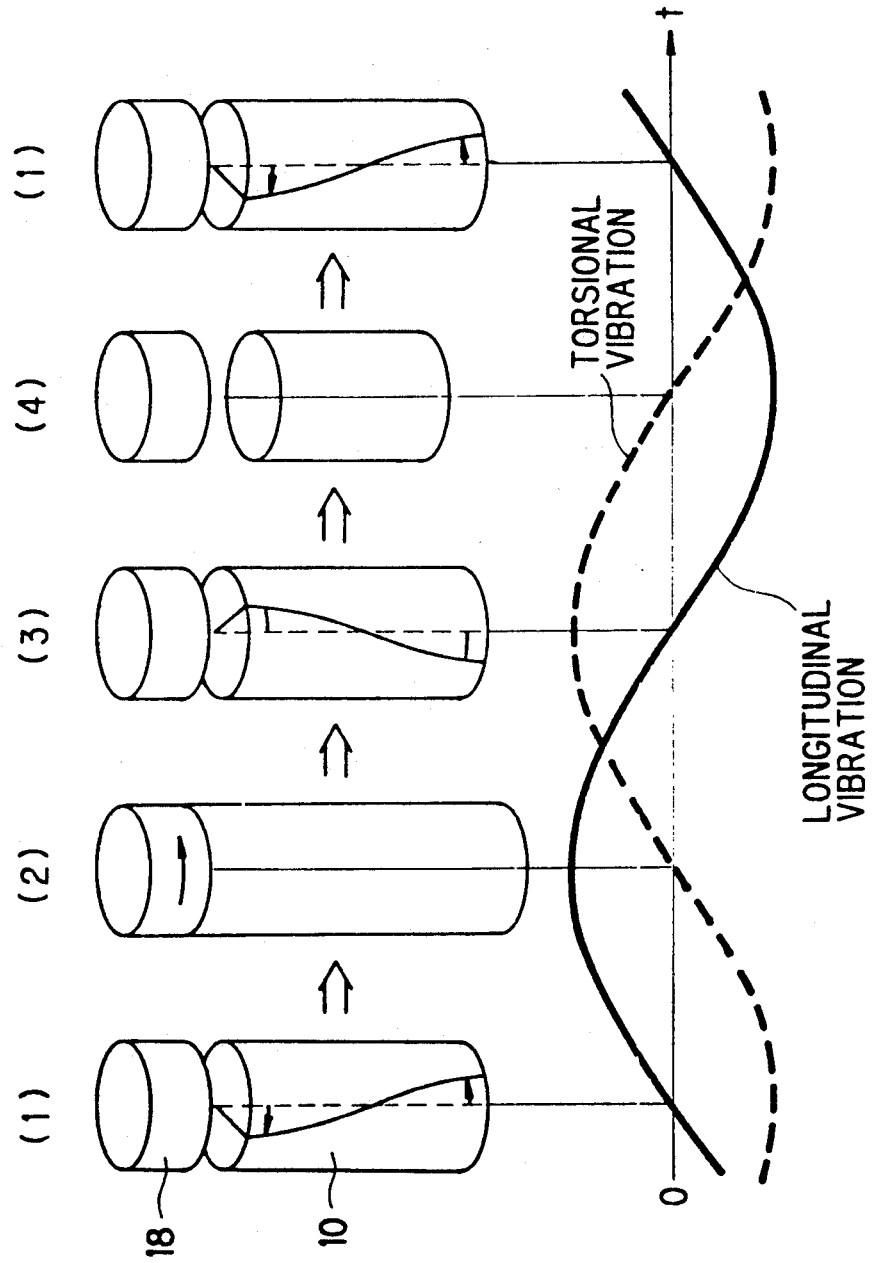
FIG. 2 is an explanatory view illustrating the principle of the conventional ultrasonic motor.

FIG. 2 shows an explanatory view illustrating the principle of the conventional ultrasonic motor. The longitudinal vibration functions as a clutch, and transmits one direction displacement of the torsional vibration of the stator 10 to the rotor 18. That is, only when the longitudinal vibration is at the maximum level as shown in the state (2), the displacement is transmitted from the stator 10 to the rotor 18. In the ultrasonic motor, the longitudinal and torsional vibrations are generated simultaneously as a resonance vibration to obtain an elliptic vibration which is a resultant vibration of the longitudinal and torsional vibrations efficiently and intensively in the interface of the rotor 18 and the stator 10. It is necessary that resonance frequencies of the longitudinal and torsional vibrations are equal in order to excite the effective resonance vibration. In this ultrasonic motor, the equality of the resonance frequencies of the longitudinal and torsional vibrations is realized in a state that a small electric field is applied, and the contact-pressure between the rotor 18 and the stator 10 is adjusted by use of the shaft 23 having an adequate diameter which is mounted vertically on the stator 10 and the spring 21 provided therearound.

Figure 3A:
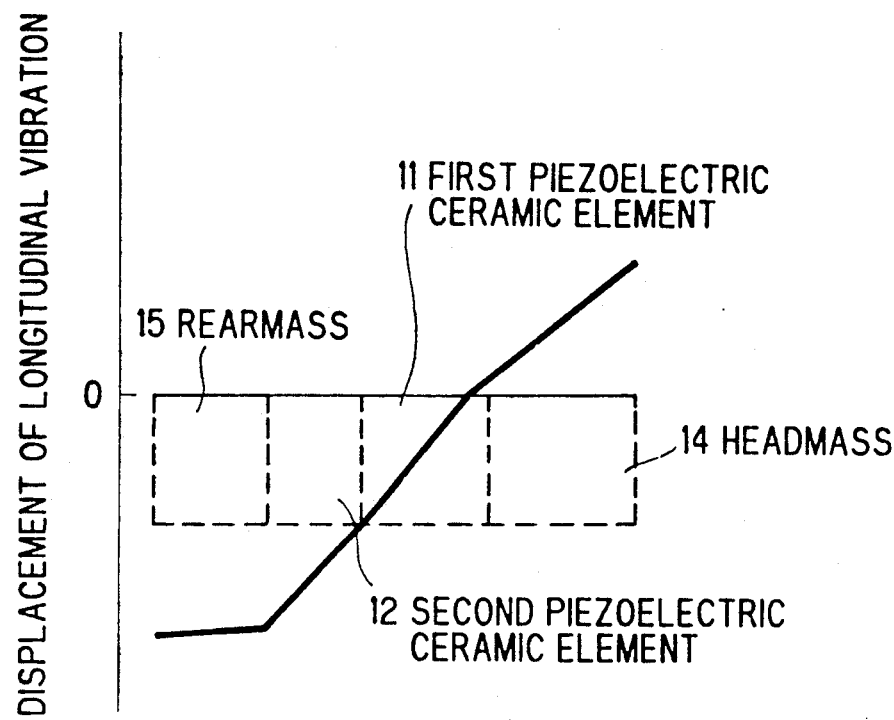
FIG. 3(a) and 3(b) show a diagram illustrating displacement of the longitudinal and torsional vibrations in the conventional ultrasonic motor.
Figure 3B:
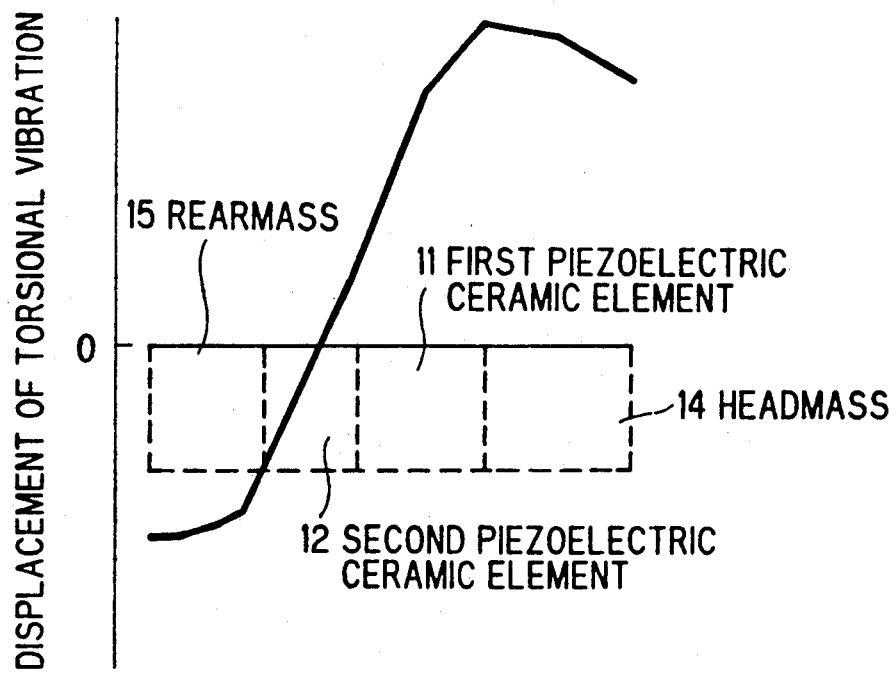

FIG. 3 is a diagram illustrating displacements of the longitudinal and torsional vibrations in the conventional ultrasonic motor in a state that a large electric field is applied. In FIG. 3, the distributions of the displacements of the longitudinal and torsional vibrations are different, for the reason that a phase speed of the longitudinal vibration is approximately 1.6 times larger than that of the torsional vibration. Further, a characteristic mechanical impedance $Z_{OL}$ of the longitudinal vibration is a function of a squared diameter in a case of a hollow cylindrical stator, on the other hand, a characteristic mechanical impedance $Z_{OT}$ of the torsional vibration is a function of a power of four on a diameter in a case of a hollow cylindrical stator. The characteristic mechanical impedances $Z_{OL}$ and $Z_{OT}$ are defined as follows.

$$Z_{OL} = \rho C_L A = (\Pi/4)\rho C_L (D_0^2 - D_1^2) \quad (I)$$

$$Z_{OT} = \rho C_T J_P = (\Pi/32)\rho C_T (D_0^4 - D_1^4) \quad (II)$$

Where, $\rho$ is a density of the hollow cylindrical stator, $C_L$ is a phase speed of a longitudinal elastic wave, $C_T$ is a phase speed of a torsional elastic wave, A is a cross sectional area of a hollow cylindrical stator, $D_1$ and $D_0$ are respectively an inner diameter and an outer diameter of the hollow cylindrical stator, and $J_P$ is a polar moment of inertia of area of the hollow cylindrical stator.

Studying the vibration modes of the longitudinal and torsional vibrations, the difference between the amplitudes of the longitudinal and torsional vibrations becomes large at the headmass and at the piezoelectric ceramic (second) element for generating the torsional vibration. From this, it is understood that it is necessary to change characteristic mechanical impedances $Z_{OL}$ and $Z_{OT}$ in order to equalize the resonance frequencies of the longitudinal and torsional vibrations. In order to change characteristic mechanical impedances $Z_{OL}$ and $Z_{OT}$, the headmass must have a large stiffness against the longitudinal vibration and a large inertial mass against the reacting vibration.

Next, FIG. 4 shows an ultrasonic motor in a first preferred embodiment according to the invention.

The ultrasonic motor has a length of 70 mm and a diameter of 20 mm. The ultrasonic motor comprises a combined headmass 34 of a first headmass 34a and a second headmass 34b. The first headmass 34a is made of a light and stiff material such as Aluminum or Titanium alloy. The second headmass 34b is made of a highly dense and elastic material such as stainless steel. The first headmass 34a is integrated with a stainless steel bolt 16 having a collar 25 by welding. The headmass 34b has a collar 34c to increase an inertial mass. The headmass 34a is fitted into a cavity of the headmass 34b surrounded by the collar 34c to integrate the two headmasses 34a and 34b such that the two headmass 34a and 34b have the same axis. The headmass 34b has a height of 4 mm in the inner part of the collar 34c, a height of 8 mm in the outer part of the collar 34c, an inner diameter of 20.1 mm, and an outer diameter of 24 mm. The headmass 34a has an outer diameter of 20 mm. The combined headmass 34 has a height of 11 mm. The headmasses 34a and 34b, a first piezoelectric ceramic element 11 which is made of Lead Zirconate Titanate ceramic for generating a longitudinal vibration, a supporter 13 made of stainless steel, a second piezoelectric ceramic element 12 which is made of Lead Zirconate Titanate ceramic for generating a torsional vibration, and a rearmass 15 made of Copper Pyrite are all together assembled firmly by a bolt 16 and a nut 17, and they compose a stator 10 as a longitudinal-torsional composite vibrator. A stainless steel rotor 18 has a height of 8 mm. A shaft 23 passes through a seat 20, and a spring 21 which is mounted on the seat 20 to be screwed with a nut 22. The shaft 23, the spring 21 and the nut 22 give a contact-pressure between the rotor 18 and stator 10 via bearings 19. The contact-pressure is controlled finely by adjusting a revolution angle of the nut 22. A wear resistant member 24 made of engineering-plastic is attached to the rotor 18 to prevent the surface of the rotor 18 from abrading.

In operation, an intensive ultrasonic longitudinal-torsional composite elliptic vibration is generated in the interface between the stator 10 and the rotor 18 by applying predetermined voltages to the first and second piezoelectric ceramic elements 11 and 12 while adjusting a phase difference of the voltages adequately, so that the resonance frequencies $f_T$ and $f_L$ of the longitudinal and torsional vibrations are equalized even in a state of a large electric field providing a high power. The collar 34c of the headmass 34b has little stiffness against the longitudinal vibration, so that the collar 34c affects no change in the resonance frequency of the longitudinal vibration. On the other hand, the collar 34c affects the decrease of the resonance frequency of the torsional vibration largely, as the collar 34c functions as a large inertial mass against the torsional vibration. Therefore, the equalization of the resonance frequencies of the longitudinal and torsional vibrations is realized by changing the mass of the collar 34c. In the ultrasonic motor having dimensions described above, the resonance frequencies of the longitudinal and torsional vibrations are 31.6 kHz and 31.1 kHz, respectively, when a high power excitation is carried out on conditions that the contact-pressure between the rotor 18 and the stator 10 is maintained at 50 kgf and that the driving voltages which are supplied to the first and second piezoelectric ceramic elements 11 and 12 are 80 V(rms), respectively. In order to equalize the two resonance frequencies, the mass of the collar 34c is decreased by slashing the collar 34c. As a result, the equality of the resonance frequencies of the longitudinal and torsional vibrations is realized when the resonance frequencies are 31.5 kHz.

Figure 5:
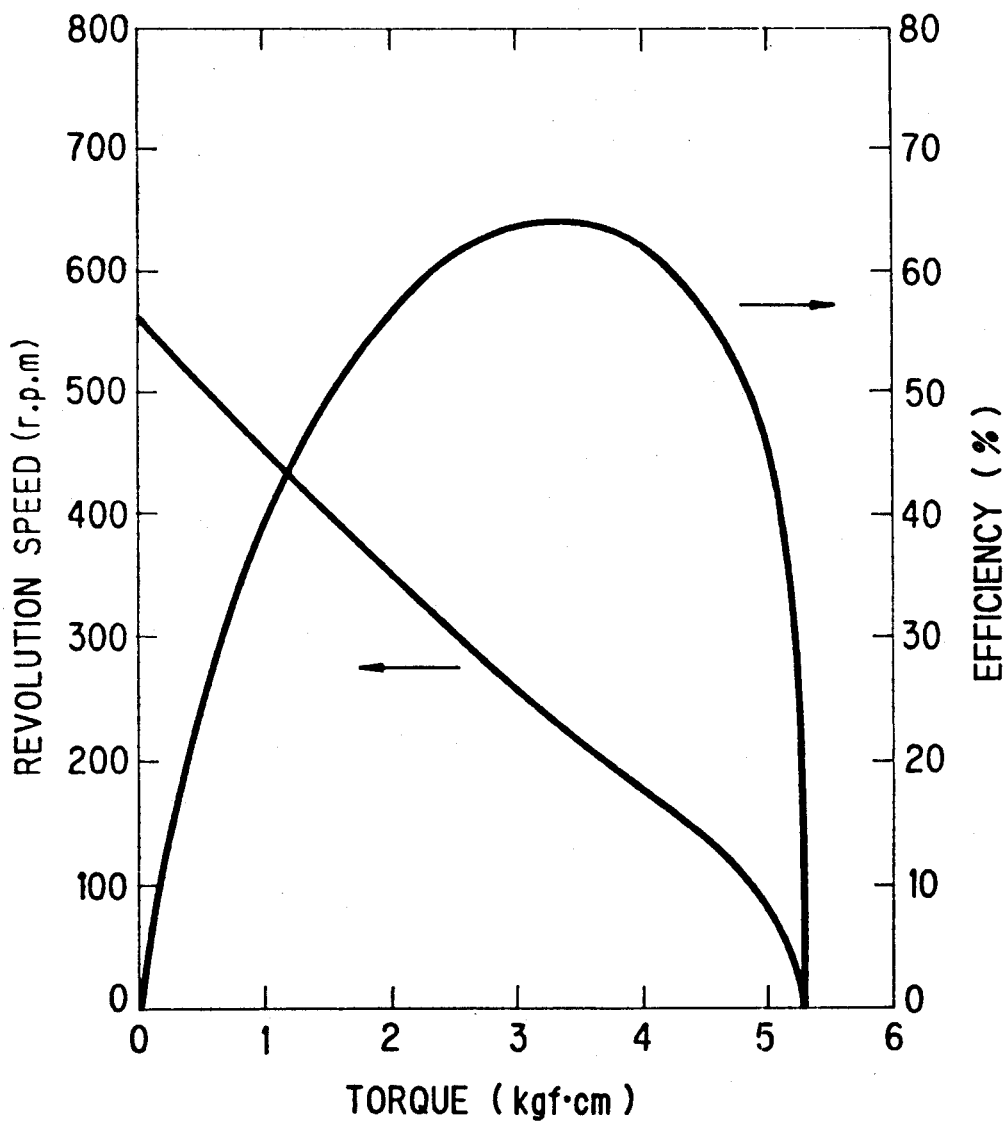
FIG. 5 is a diagram illustrating relations between a revolution speed and an efficiency versus a torque in the first preferred embodiment according to the invention.

The rotor 18 rotates clockwise, when the phase difference of the voltages applied to the first and second piezoelectric ceramic elements 11 and 12 is set at an angle of 70 degrees, while the voltages are maintained at the same values as before. FIG. 5 is a diagram illustrating relations between revolution speed and efficiency versus a torque in the first preferred embodiment according to the invention. The ultrasonic motor in which the resonance frequencies of the longitudinal and torsional vibrations are equal has characteristics such that the rotating speed with no load is 520 r.p.m, the maximum torque is 5.1 kgf·cm, and the maximum efficiency is 63%.

On the other hand, the rotor 18 rotates counterclockwise, when the phase difference of the voltages applied to the first and second piezoelectric ceramic elements 11 and 12 is set at an angle of 250 degrees, while the voltages are maintained at the same values as before. In this case, the same characteristics as those in the case of clockwise rotation are obtained.

Figure 6:
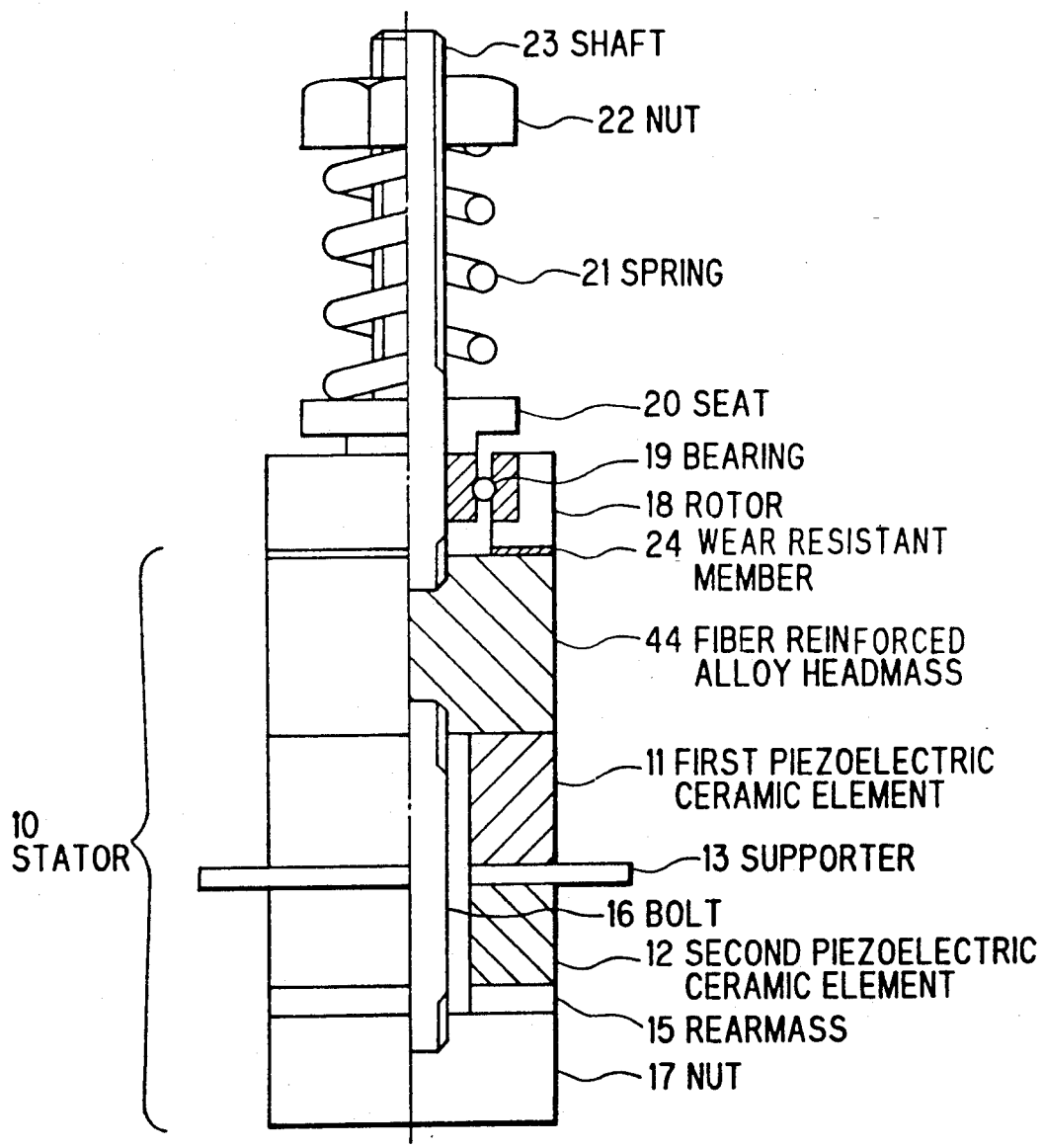
FIG. 6 is a partial cross sectional view illustrating an ultrasonic motor in a second preferred embodiment according to the invention.

FIG. 6 is an ultrasonic motor in a second preferred embodiment according to the invention. A structure of the ultrasonic motor is the same as that in FIG. 1, except for the headmass 14 is replaced by a headmass 44 which is made of fiber-reinforced alloy, particularly Aluminum alloy which includes whiskers of $Al_2O_3$. The whiskers are deployed in the direction of the axis of the ultrasonic motor. In this ultrasonic motor, the equality of the resonance frequencies of the longitudinal and torsional vibrations are realized when the resonance frequencies are 32.1 kHz.

The rotor 18 rotates clockwise, when the phase difference of the voltages applied to the first and second piezoelectric ceramic elements 11 and 12 is set at an angle of 70 degrees, while the voltages are maintained at the same values as before. On the other hand, the rotor 18 rotates counterclockwise, when the phase difference of the voltages applied to the piezoelectric ceramic elements 11 and 12 is set at an angle of 250 degrees, while the voltages are maintained at the same values as before. The ultrasonic motor in which the resonance frequencies of the longitudinal and torsional vibrations are equal has characteristics such that the rotating speed with no load is 520 r.p.m, the maximum torque is 5.1 kgf cm, and the maximum efficiency is 63%.

In this second preferred embodiment, the resonance frequency or the longitudinal vibration is largely changed, because the headmass 44 of the aforementioned fiber-reinforced alloy functions as providing a high Young's modulus relative to the longitudinal vibration. On the other hand, the resonance frequency of the torsional vibration is not changed substantially, because the headmass 44 functions as an isotropic material relative to the torsional vibration.

Although the invention has been described with respect to specific embodiment for complete and clear disclosure, the appended claims are not limited thereto. Alternative constructions may occur to one skilled in the art which fairly fall within the basic teaching herein set forth.

What is claimed is:
1. An ultrasonic motor, comprising:
   a stator for generating an ultrasonic elliptic vibration from a combination of longitudinal and torsional vibrations, said stator including a head mass defined by a first head mass having a stiffness which resists longitudinal vibrations and a second head mass having an inertial mass which resists torsional vibrations, a rear mass and first and second piezoelectric elements positioned between the head mass and the rear mass; and
   a rotor in press-contact with said stator to receive said ultrasonic vibration via a friction force form said stator.
2. An ultrasonic motor, according to claim 1, wherein:
   said first headmass is made of a light and stiff material.
3. An ultrasonic motor, according to claim 1, wherein:
   said first headmass is made of a material selected from Aluminum alloy and Titanium alloy.
4. An ultrasonic motor, according to claim 1, wherein:
   said second headmass is made of a highly dense, elastic material.
5. An ultrasonic motor, according to claim 1, wherein:
   said second headmass is made of stainless steel.
6. An ultrasonic motor, according to claim 1, wherein:
   said headmass is made of a fiber-reinforced alloy in which fibers are deployed in a direction of an axis of said ultrasonic motor.
7. An ultrasonic motor, according to claim 8, wherein:
   said fiber-reinforced alloy is Aluminum alloy which includes whiskers of $Al_2O_3$.
8. An ultrasonic motor, according to claim 1, wherein:
   said piezoelectric element is a Lead Zirconate Titanate piezoelectric ceramic element.
9. An ultrasonic motor, comprising:
   a stator including a head mass, a rear mass, a first piezoelectric element for generating longitudinal vibrations and a second piezoelectric element for generating torsional vibrations, said first and second piezoelectric elements being positioned between the head mass and the rear mass; and
   a rotor for providing ultrasonic elliptic vibrations in accordance with the longitudinal and torsional vibrations of said stator;
   wherein said head mass is made of a fiber-reinforced alloy in which fibers are deployed in an axial direction of the ultrasonic motor.
10. An ultrasonic motor, comprising:
    a stator for generating an ultrasonic elliptic vibration including first and second piezoelectric elements for generating longitudinal and torsional vibra- tions, a first head mass, a second head mass having a circumferential collar, the first head mass being disposed in a cavity of the second head mass such that the first and second head masses have a common axis; and a rotor in press-contact with said stator to receive the ultrasonic elliptic vibrations via a friction force from said stator.

* * * * *